Aug. 5, 1958 W. MITCHELL ET AL 2,845,788
MANUFACTURE OF FURS
Filed Oct. 18, 1955 2 Sheets-Sheet 1

INVENTORS:
WILLIAM MITCHELL
MURRAY MITCHELL
LOUIS NIERENBERG
BY
Frank Makora
ATTORNEY

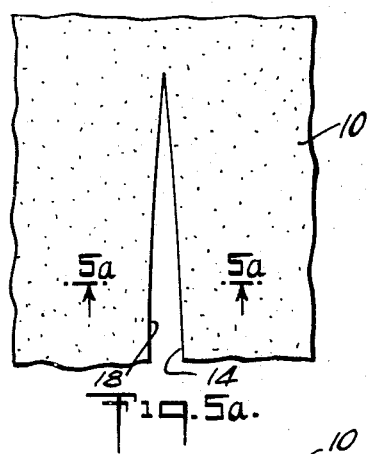
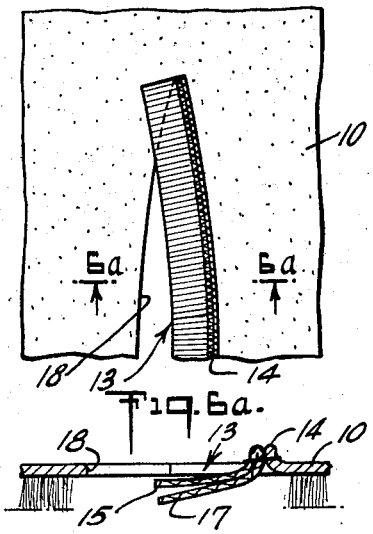
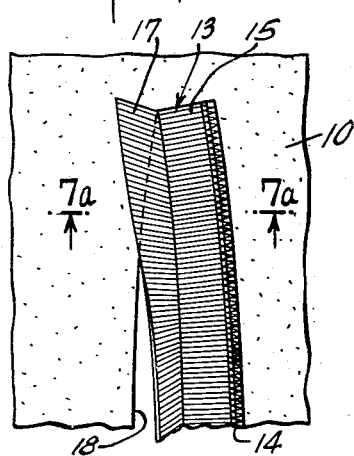
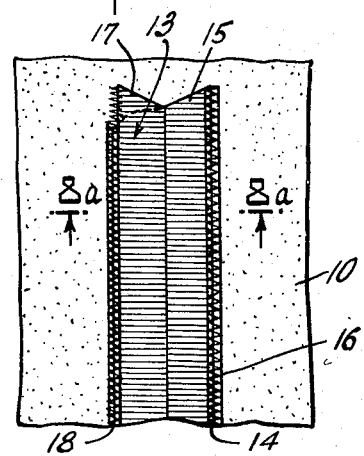
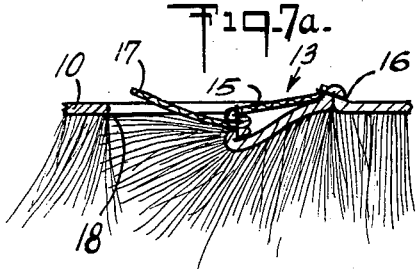
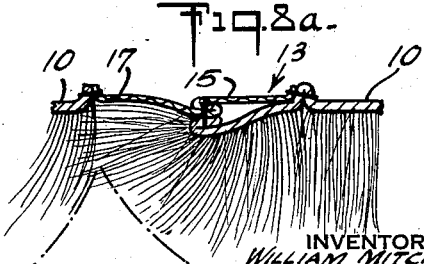

United States Patent Office 2,845,788
Patented Aug. 5, 1958

2,845,788

MANUFACTURE OF FURS

William Mitchell and Murray Mitchell, Brooklyn, N. Y., and Louis Nierenberg, Stamford, Conn.

Application October 18, 1955, Serial No. 541,127

2 Claims. (Cl. 69—22)

This invention relates to a method of manufacture of fur pieces and to the article of manufacture resulting therefrom.

It is an object of this invention to provide a fur piece from a single large animal skin or from a large area of synthetic fur made from textile material yet having the appearance of having been prepared from many small animal skins.

It is another object of this invention to provide a method for preparing a fur piece having the appearance of a many skinned small animal fur piece from a single large animal skin or a minimum number of large animal skins.

It is another objective to provide an inexpensive fur piece of extreme beauty having uniformity of appearance of matched skin pieces.

It is yet another objective to provide a fur piece having a maximum amount of pliability and drape effect.

It is a further objective to provide a stole or other fur piece having a resiliency that hugs the shoulders of the wearer.

It is another objective to provide templates adapted to effect rapid slitting of an animal skin.

Figure 1:
Figure 2:
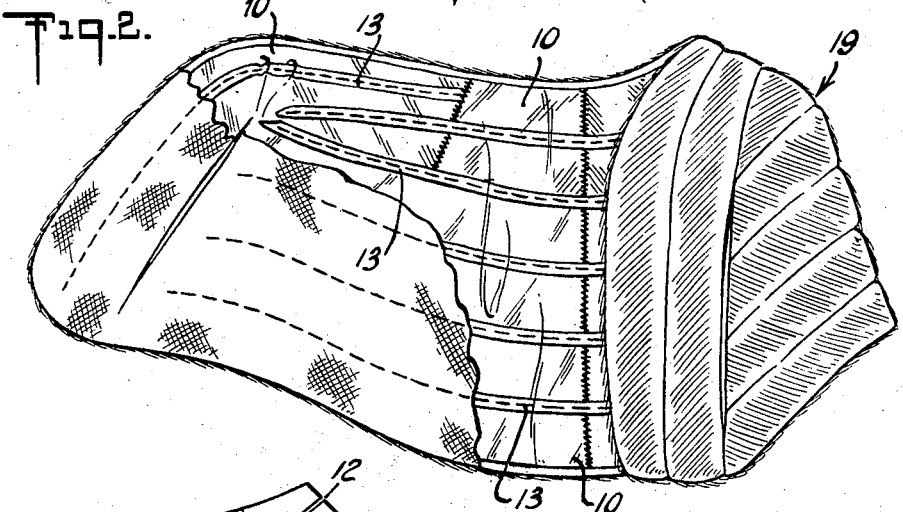
Figure 3:
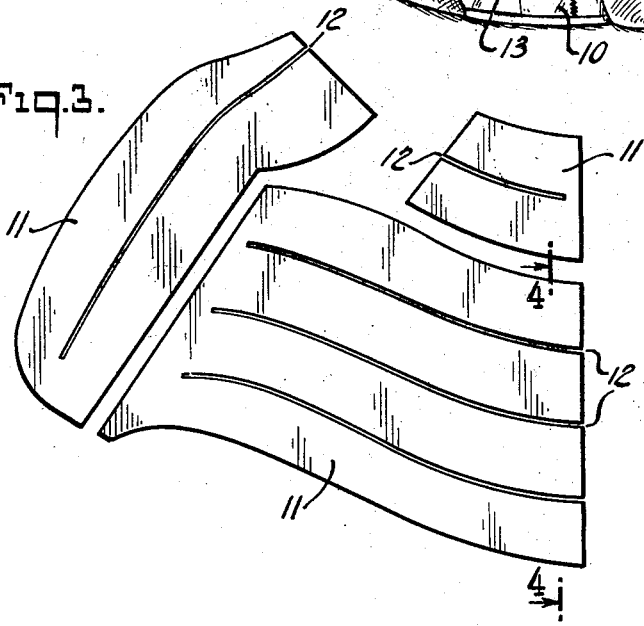
Figure 4:
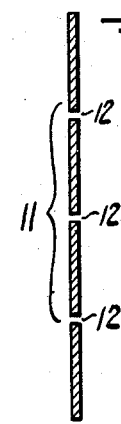

These and other objectives will become apparent upon reading the following descriptive disclosure taken in conjunction with the accompanying drawing in which:

Fig. 1 is a stole fur piece prepared by the method of this invention,

Fig. 2 is a view of the interior of the stole of Fig. 1 with the cloth lining broken away in part to show the manner of construction of the fur piece, Fig. 3 is a view of the three template pieces used to produce one half of the stole, the same templates being reversed to produce the mating half of said stole, Fig. 4 is a view taken on line 4—4 of Fig. 3 and showing the slits in the template used for guiding a cutting knife, Fig 5 is a top enlarged detailed view of a slit in a skin, Fig. 5a is a cross-section of an animal skin taken on line 5a—5a of Fig. 5, Fig. 6 is a top detailed view similar to Fig. 5 but showing a textile double folded tape sewn to one side of the slit, Fig. 6a is a section view taken on line 6a—6a of Fig. 6 and showing the manner of sewing the double fold of the folded textile tape to a slit edge of the skin, Fig. 7 is a top detailed view showing the next sewing operation to that shown in Fig. 6 and presenting the manner of securing one of the free edges of the textile tape to the body area of the skin itself, Fig. 7a is a section view taken on line 7a—7a of Fig. 7 and showing the very important step of convoluting the fur slit edge sewn to the double fold of the tape, Fig. 8 is a top detailed view showing the manner of sewing the remaining free tape edge to the remaining slit edge of the slitted animal skin, and Fig. 8a is a section view in detail taken on line 8a—8a of Fig. 8 and showing the folded tape completely sewn in the slit with the convoluted fur presenting the appearance of an individual skin piece sewn to another individual skin piece.

According to this invention a single animal skin, for example sheepskin suitably prepared, is given the appearance of a fur piece prepared from many small animals, for example mink.

The fur piece may be of any configuration for example fur stole, fur jacket, or fur coat and while it is prepared from but one or at most a few large animal skins, nevertheless it presents the appearance of having been prepared from many separate accurately matched skins.

Referring now to the drawing, a template Fig. 3 for cutting the sectional pieces for a stole is made from any suitable flat board like material, for example from hard Masonite.

The template is prepared from a minimum of separate sectional pieces according to the style of the fur garment to be made. All sectional pieces are provided with one or more slits, said slits being sewn to a double folded textile tape in a manner to be described to give the appearance of separate skins joined together.

The template is provided with suitably curvatured slits at intervals associated with the width of small animal skins.

In preparing a fur piece or garment according to this invention the appropriate templates are placed on the flesh side of the large animal skin, for example sheepskin, and the skin is cut along the exterior of the template to give a cut skin having the area of the template. Next the cut skin is slitted by inserting a sharp pointed knife or razor into each slit adjacent the closed end and into the animal skin disposed therebeneath and thereafter drawing the knife through the animal skin using the slit walls as guide walls.

In this manner using said templates, many identical cut and slitted sectional fur pieces are prepared for subsequent assembly into a fur piece or garment.

The separately cut and slitted sectional skin pieces are then prepared to give the appearance of having been prepared from many small animals for example, mink.

To this end, each slit is provided with a double folded tape of textile material, Figs. 5 to 8a inclusive, in a unique manner.

In the manufacture of the fur garment from one or more single large skins for example sheepskin, to obtain a fur piece from skin sections 10 having the appearance of having been manufactured from several small animals, for example mink, the slits of each of the cut sectional sheepskin pieces 10 cut by the aforesaid template 11 having slots 12 therein are provided with textile tape sewn thereto in a unique manner to yield an overall effect of small animal skins sewn together.

In the securing of a textile tape section 13 to a selected dual edge of a slit, the tape 13 is folded preferably along its longitudinal middle or median line and the folded line area is sewn to a selected slit edge 14, Fig. 6a.

Next, the topmost half of the sewn textile tape 15 Fig. 6a, i. e. the half of the tape adjacent the flesh side of the sheepskin is gathered and sewn to the sheepskin flesh along seam line 16 in parallel relationship to the slit edge 14 but in such a manner as to convolute or roll over the sheepskin on the fur side thereby disposing the individual fur hairs about a longitudinal axis adjacent to the sewn double fold, Fig. 7a.

After the step of convoluting the fur edge of a selected slit edge, the remaining half 17 of the folded textile tape 13 is sewn along its free exterior edge to the remaining free edge 18 of the slit, Fig. 8a.

By this process the convoluted edge of the sheepskin gives the appearance of a separate pelt sewn to another and adjacent pelt.

Manifestly where the slits are appropriately spaced in a large skin the over-all effect is a garment for example stole 19 prepared from many small skins.

The textile tape 13 may be made of cotton, synthetic fiber and of elastic threads. The tape once sewn in place gives the garment a unique softness or pliability of resiliency since the garment is more easily creased along the inserted tape sections, which tape sections are invisible due to the respective convoluted hairs of the skin at the slit.

As a result a stole or cape is made by the process of this invention which to all appearances has the eye appeal of having been made from several small pelts for example mink Fig. 1 when in fact the garment was made from only one or two sheepskins.

This invention has been described by means of illustrative examples but obviously its scope is greater than that of the illustrative embodiments used to teach the invention.

We claim:

1. A fur piece having the appearance of having been manufactured from several small skins while in fact being manufactured from a minimum of large animal skins comprising a plurality of large animal sections cut appropriately and provided with slits, a folded tape section sewn into each slit with the folded line segment thereof sewn to a slit edge and with one tape edge sewn to the flesh area of the skin in a manner to convolute the fur at the fold line segment and with the other edge of said tape sewn in a non-convolute manner to the remaining edge of the slit, said large animal sections being sewn together to form said fur piece having the appearance of a plurality of separate pelts.

2. The method of preparing a fur piece from a minimum of large animal skins to give the appearance of having been made from a plurality of small animal skins in substantial excess than the large animal skins used comprising cutting said large animal skins to form a minimum number of separate sectional pieces of appropriate contour each sectional piece being provided with at least one slit therein, sewing a double folded tape to a selected edge of said slit along the double fold line, convoluting the skin at the sewn fold line by gathering the flesh side tape section in tensioned relationship thereto, sewing the gathered tape to the flesh side of the skin in parallel relationship to the sewn slit edge, and sewing in a non-convolute manner the remaining tape section disposed toward the hair side of the skin to the remaining slit edge, thereby presenting a garment prepared from several pelts sewn together.

References Cited in the file of this patent

UNITED STATES PATENTS

| | | |
|---|---|---|
| 281,886 | Keller | July 24, 1883 |
| 794,013 | Hill | July 4, 1905 |
| 1,399,937 | Denning | Dec. 13, 1921 |
| 2,196,273 | Schatz | Apr. 9, 1940 |
| 2,287,733 | Fried | June 23, 1942 |
| 2,703,485 | Wolff | Mar. 8, 1955 |

FOREIGN PATENTS

| | | |
|---|---|---|
| 641,923 | Germany | Feb. 17, 1937 |